United States Patent [19]

Tachibana et al.

[11] Patent Number: 4,549,181
[45] Date of Patent: Oct. 22, 1985

[54] MOVING OBSTACLE DETECTION SYSTEM FOR A VEHICLE

[75] Inventors: Akira Tachibana; Masami Kiyoto, both of Yokosuka, Japan

[73] Assignee: Nissan Motor Company, Limited, Yokohama, Japan

[21] Appl. No.: 428,225

[22] Filed: Sep. 29, 1982

[30] Foreign Application Priority Data

Oct. 31, 1981 [JP] Japan .............................. 56-161891[U]

[51] Int. Cl.⁴ ........................ G08G 1/00; G01S 15/93; G01S 13/00
[52] U.S. Cl. .................................. 340/904; 340/901; 343/7 VM; 367/112; 367/909
[58] Field of Search ................................ 340/901–904, 340/53; 367/909, 112; 343/7 VM; 180/169

[56] References Cited

U.S. PATENT DOCUMENTS

| | | | |
|---|---|---|---|
| 3,680,085 | 7/1972 | Del Signore | 367/909 |
| 3,778,823 | 12/1973 | Sato | 367/909 |
| 3,860,923 | 1/1975 | Yamanaka | 343/7 VM |
| 4,240,152 | 12/1980 | Duncan | 340/901 |
| 4,450,430 | 5/1984 | Barishpolsky | 340/904 |
| 4,500,977 | 2/1985 | Gelhard | 367/909 |

FOREIGN PATENT DOCUMENTS

2734998  2/1978 Fed. Rep. of Germany .
3222900  3/1983 Fed. Rep. of Germany .

*Primary Examiner*—James J. Groody
*Attorney, Agent, or Firm*—Lowe, King, Price & Becker

[57] ABSTRACT

A moving obstacle detection system using a Doppler radar device for an automotive vehicle which detects and informs a vehicle driver that another vehicle (moving obstacle) approaches or moves away from the detecting vehicle, wherein there is provided a means for determining whether the rate of change of the period of a Doppler signal outputted from the Doppler radar equipment with respect to time exceeds a predetermined value so that an erroneous alarm in response to a pedestrian or another vehicle traversing the front detection area of the vehicle, e.g., when vehicle is at rest at in an intersection is inhibited. Consequently, more reliable detection of approach or departure of another vehicle can be achieved.

15 Claims, 10 Drawing Figures

MOVING OBSTACLE DETECTION SYSTEM FOR A VEHICLE

BACKGROUND OF THE INVENTION

Field of the Invention

The present invention relates to a system which informs a vehicle driver that another vehicle or pedestrian (moving obstacle) is approaching or moving away from a front detection area in response to detection of frequency deviation between the electric or ultrasonic waves transmitted by the system (Doppler radar) and the corresponding wave reflected from the moving obstacle, wherein detection of obstacles moving across the field of detection, rather than toward or away from the vehicle when the vehicle is stopped, is inhibited.

SUMMARY OF THE INVENTION

It is an object of the present invention to provide a moving obstacle detection system for a vehicle using Doppler radar which informs the vehicle driver that another vehicle is approaching or moving away from a front detection area of the vehicle wherein the moving obstacle detection system does not inform the driver that other vehicle or pedestrians are moving across the front detection area of the vehicle toward which the Doppler radar is directed when the vehicle is stopped, such as at an intersection.

This can be achieved by inhibiting a display operation when the rate of change with respect to time of either frequency or phase in a Doppler radar signal exceeds a corresponding predetermined value.

BRIEF DESCRIPTION OF THE DRAWINGS

The features and advantages of the present invention will be appreciated from the foregoing description in conjunction with the attached drawings in which like reference numerals designate corresponding elements and in which.

DETAILED DESCRIPTION OF THE PREFERRED EMBODIMENTS

Reference will be made hereinafter to the attached drawings in order to facilitate understanding of the present invention.

Figure 1A:
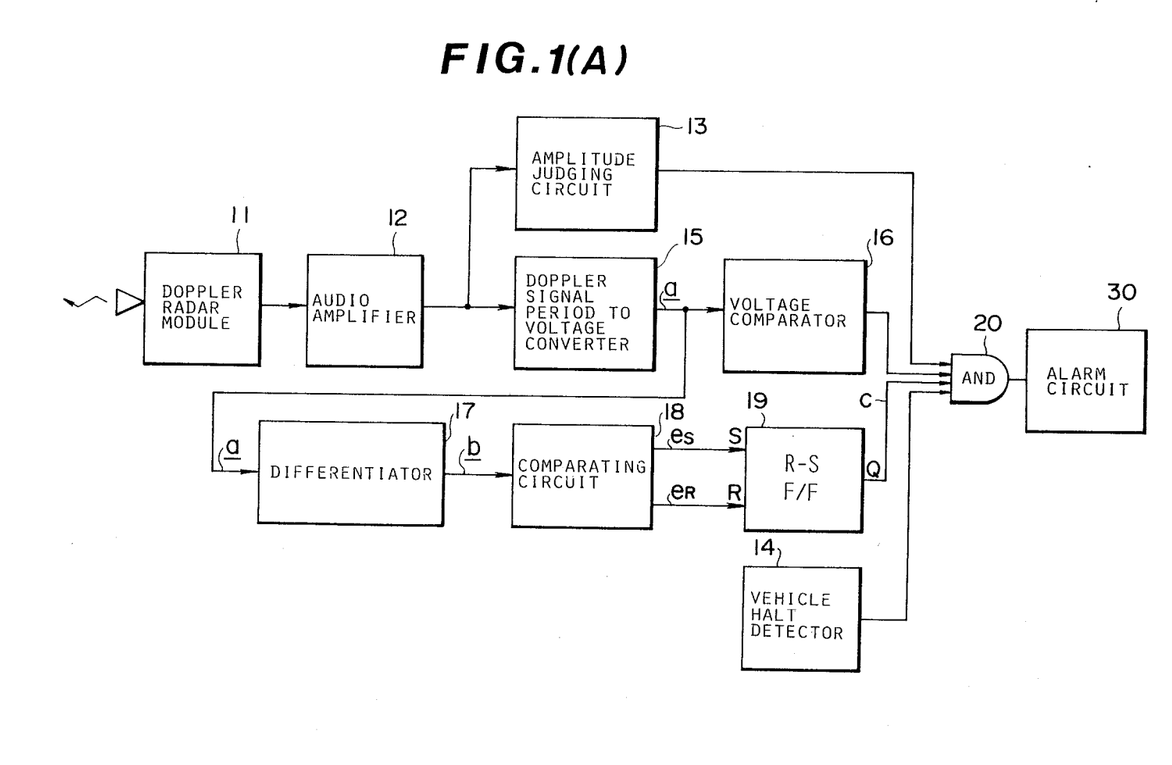
FIG. 1(A) is a simplified block diagram showing a first preferred embodiment of a moving obstacle detection system according to the present invention.
Figure 1B:
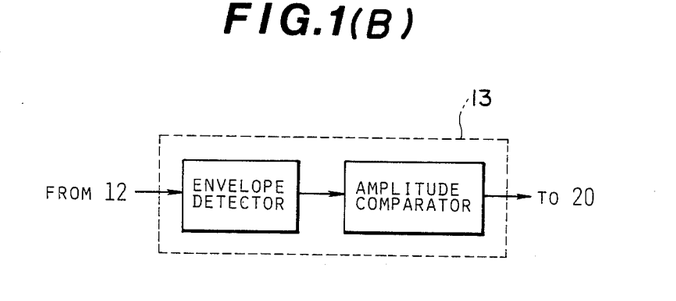
FIGS. 1(B) through 1(D) are simplified block diagrams each showing an example of one circuit block shown in FIG. 1(B)

First in FIG. 1(A), showing a first preferred embodiment of a moving obstacle detection system for a vehicle according to the present invention, numeral 11 denotes a Doppler radar module including a transceiver device and a directional antenna which transmits, e.g., high-frequency electrical waves toward a detection area in front of the vehicle, receives a reflected wave reflected from a moving obstacle, e.g., another vehicle presently in the detection area thereof, and outputs a Doppler signal with a beat frequency indicating the frequency difference between the transmitted wave and reflected wave in accordance with the Doppler effect. The Doppler signal has a frequency $f_d$ of several tens of hertz which is proportional to the relative speed of the obstacle and the vehicle. Numeral 12 denotes an audio amplifier which amplifies the Doppler signal from the Doppler radar module 11. Numeral 13 denotes an amplitude judging circuit comprising, e.g., an envelope modulator which produces an envelope defined by the peak positive amplitude of the amplified Doppler signal and an amplitude comparator which compares the level of the envelope with a predetermined threshold value and outputs a high-level voltage signal when the envelope level exceeds the predetermined threshold value so as to detect a predetermined distance between a moving obstacle and the vehicle. An example of the amplitude judging circuit 13 is typically shown in FIG. 1(B). Numeral 14 denotes a vehicle halt detector which detects whether the vehicle is at rest by means of a side brake or vehicle speed sensor and outputs a high-level voltage signal when the vehicle is at rest.

Figure 1C:
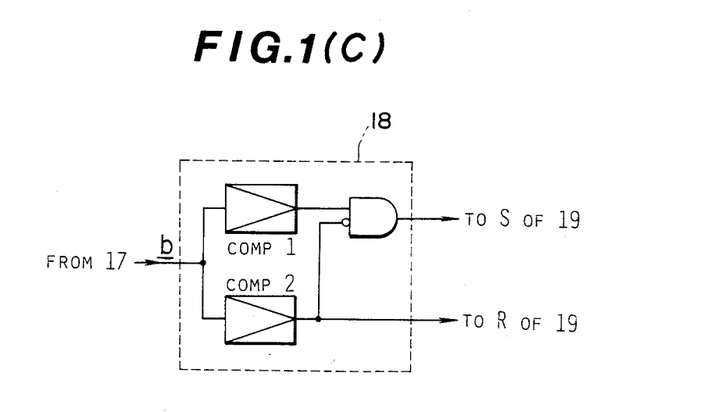
Figure 1D:
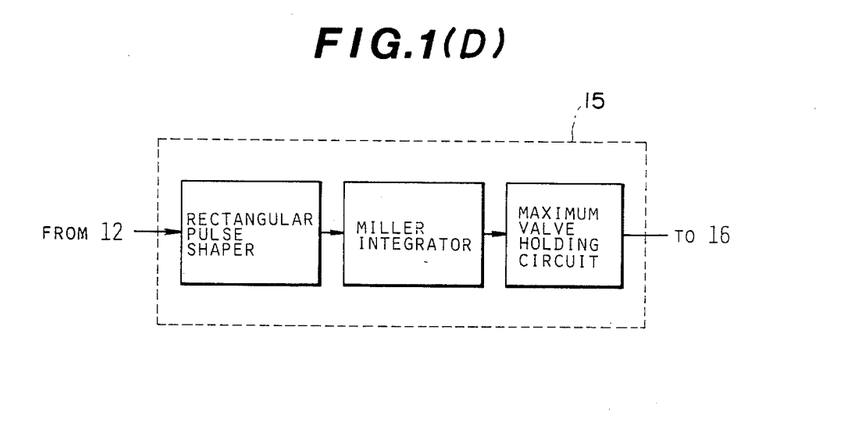

Numeral 15 denotes a Doppler signal period-to-voltage converter which detects the period of the Doppler signal, converts it into a corresponding voltage signal a and holds the voltage signal until a subsequent change in the frequency period is detected. Numeral 16 denotes another amplitude comparator which compares the output voltage signal level of the frequency period-to-voltage comparator 15 with a predetermined threshold value and outputs a high-level voltage signal when the voltage signal a exceeds the predetermined threshold value. Numeral 17 denotes a differentiator which responds to either the leading or the trailing edge of the voltage signal a from the period-to-voltage converter 15 to output a pulse corresponding to each change in period. An example of the period-to-voltage converter 15 is typicaly shown in FIG. 1(D). Numeral 18 denotes a comparing circuit including, e.g., two parallel comparators, one of which compares the differentiated voltage signal b from the differentiator 17 to a first predetermined threshold level $r_1$ and outputs a set signal $e_s$ (a high-level voltage signal) when the differentiated voltage signal b exceeds the first predetermined threshold level $r_1$ and the other of which compares the differentiated voltage signal b with a second predetermined threshold level $r_2$ and outputs a reset signal $e_r$ (a high-level voltage signal) when the differentiated voltage signal b exceeds the second predetermined threshold level $r_2$. It should be noted that the second threshold level $r_2$ is higher than the first threshold level $r_1$ and the comparing circuit 18 is so constructed that the output of the set signal $e_s$ is inhibited when the reset signal $e_r$ is outputted, e.g., by means of an AND gate circuit having an inverter circuit at the input terminal connected to the output terminal of the latter comparator. An example of the comparing circuit 18 is typically shown in FIG. 1(C).

Numeral 19 denotes a flip-flop circuit (hereinafter referred to simply as R-S F/F) of, e.g., set-reset type, the set terminal S of which is connected to one output terminal of the comparing circuit 18 in order to receive the set signal $e_s$ from the first (former) comparator and the reset terminal R of which is connected to the other output terminal of the comparing circuit in order to receive the reset signal $e_r$ from the second (later) comparator. The Q output terminal of R-S F/F 19 outputs a high-level voltage signal c when the high-level voltage signal $e_s$ is received at the set terminal thereof. Numeral 20 denotes an AND gate circuit receiving as inputs signal from the amplitude judging circuit 13, the voltage comparator 16, the R-S flip-flop 19, and the vehicle halt detector 14 and which outputs a predetermined high-level voltage signal when all signals input thereto are high level voltages. Numeral 30 denotes an alarm circuit which produces an alarm in a predetermined form when the high-level voltage signal from the AND gate circuit 20 continues over a predetermined length of time.

The operation of the first preferred embodiment shown in FIG. 1 is described hereinafter with reference to FIGS. 2(A), 2(B), 3 and 4.

Figure 2A:
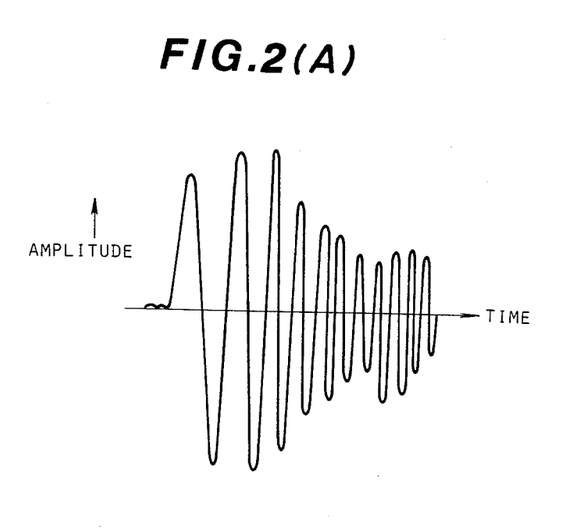
FIGS. 2(A) and 2(B) are typical waveforms of output signals of a Doppler radar module in the case when another vehicle in the front detection area of a vehicle in which the moving obstacle detection system is mounted is moving away therefrom and in the case when a pedestrian walks across the front detection area thereof, respectively.
Figure 3:
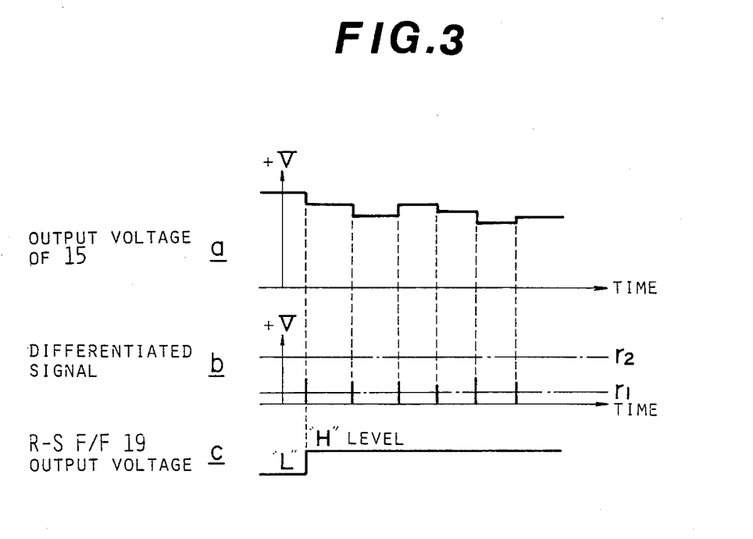
FIG. 3 is a signal waveform timing chart for some of the signals shown in FIG. 1 when the Doppler signal is outputted as shown in FIG. 2(A)

For example when another vehicle presently in the front detection area of the vehicle toward which the Doppler radar is directed is moving away from the detecting vehicle, a Doppler signal such as is shown in FIG. 2(A) is outputted into the amplifier 12. As can be appreciated from FIG. 2(A), the change in frequency period of the Doppler signal is so small that the increment of change of the output voltage signal a from the period-to-voltage converter 15 for each period thereof is relatively small as shown in FIG. 3. Therefore, the level of the differentiated signal b of the differentiator 17 does not exceed the second predetermined threshold value $r_2$ but does exceeds the first predetermined threshold value $r_1$ as shown in FIG. 3. Consequently, the R-S F/F 19 outputs the high-level voltage signal c as shown in FIG. 3 to the AND gate circuit 20. At this time, if the vehicle halt detector 14, the comparator 16, and the amplitude judging circuit 13 all output high-level voltage signals, the AND gate circuit 20 will output a high-level voltage signal to the alarm circuit 30 when the R-S F/F 19 outputs the high-level voltage signal c. As a result, the alarm circuit 30 is actuated to notify the driver that the other vehicle in front of the vehicle is moving away therefrom.

Figure 2B:
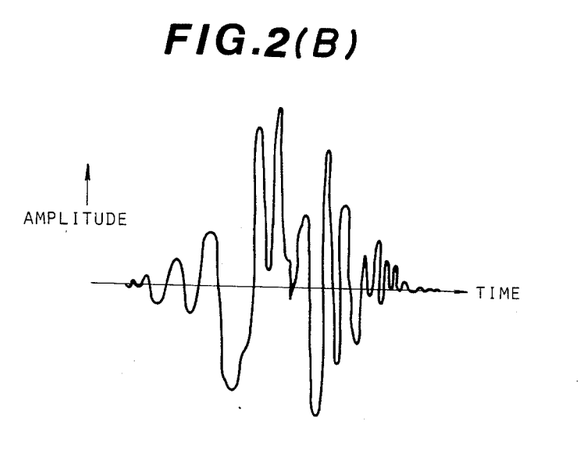
Figure 4:
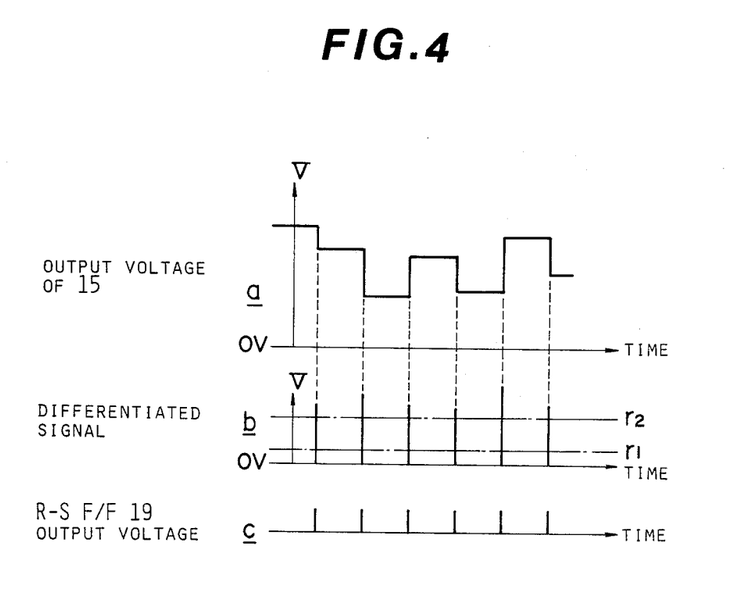
FIG. 4 is a signal waveform timing chart for some of the signals shown in FIG. 1 when the Doppler signal is outputted as shown in FIG. 2(B)

On the other hand, when a pedestrian walks across the front detection area of the Doppler radar, a Doppler signal such as is shown in FIG. 2(B) is outputted from the Doppler radar module 11. As appreciated from FIG. 2(B), the rate of change of frequency is abrupt and the change in the period is so large that the output voltage signal a of the period-to-voltage converter 15 changes abruptly as the period changes as shown in FIG. 4. Therefore, the level of the differentiated signal b of the differentiator 17 exceeds both first and second predetermined threshold values $r_1$ and $r_2$ as shown by b of FIG. 4. Consequently, the R-S F/F 19 outputs a spike (glitch) as shown by c of FIG. 4. The pulsewidth of signal c is so short in this case because the reset signal $e_r$ is inputted to the R-S F/F 19 almost immediately after the set signal $e_s$ is inputted to the R-S F/F 19. The glitches shown by c of FIG. 4 are generated in synchronization with the generation of the differentiated signal b. At this time, even if the other input signals of the AND gate circuit 20 are high-level voltages, the alarm circuit 30 does not produce alarm since the duration of the pulses of the voltage signal c from the R-S F/F 19 is not long enough to actuate the alarm circuit 30. Therefore, the AND gate circuit 20 is effectively disabled by the output signal from the R-S F/F 19, so that erroneous operation of the alarm circuit 30 can be prevented.

It should be noted that a reset-priority-type flip-flop may be used instead of the R-S F/F described above in order to prevent any high-level output therefrom, i.e., to fix the output signal from the flip-flop 19 to a low-level voltage signal.

It should also be noted that when a pedestrian walks across the front detection area of the vehicle, the differentiated signal b having a level below the second predetermined threshold value $r_2$ will often be generated. As a result, the R-S F/F 19 will be set to output a high-level output signal. However, the alarm circuit 30 is so constructed that the alarm operation will not be performed if the high-level voltage signal of the AND gate circuit 20 does not continue over a fixed interval of time which corresponds to several periods of the Doppler signal. Therefore, an erroneous alarm will not be produced in the case described hereinabove.

Figure 5:
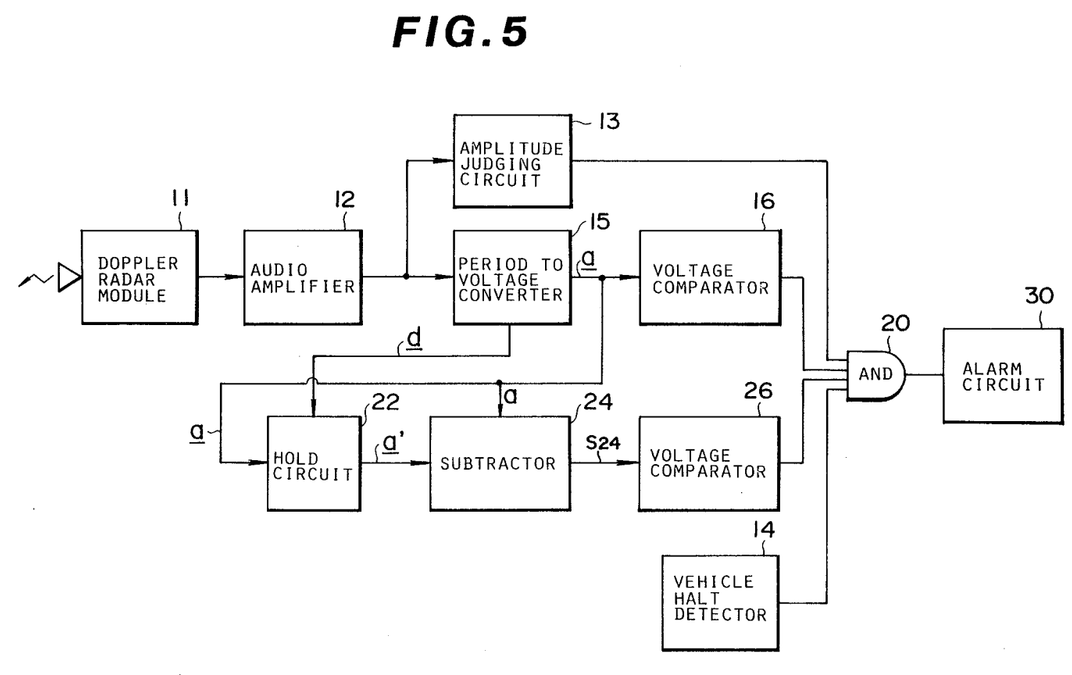
FIG. 5 is a simplified block diagram showing a second preferred embodiment of the moving obstacle detection system according to the present invention.

FIG. 5 shows a second preferred embodiment of the moving obstacle detection system. In this embodiment, the change in period of the Doppler signal is detected for each period and the alarm operation is inhibited when the rate of change of the phase of the Doppler signal with respect to time exceeds a predetermined value.

In FIG. 5, the Doppler radar module 11, audio amplifier 12, amplitude judging circuit 13, period-to-voltage converter 15, vehicle halt detector 14, AND gate circuit 20, and alarm circuit 30 are the same as in the first preferred embodiment shown in FIG. 1. The difference is that the moving obstacle detection system comprises a hold circuit 22 which holds the output voltage a of the period-to-voltage converter 15 so as to delay the output voltage a by one period, a subtractor 24 which produces a frequency difference signal $S_{24}$ which indicates the absolute value of the difference between the output voltage a of the period-to-voltage converter 15 and the output voltage a' of the hold circuit 22 which represents the previous period, and another comparator 26 which outputs a low-level voltage signal when the frequency difference signal outputted from the subtractor 24 exceeds a predetermined reference level r so as to inhibit the AND gate circuit 20.

It should be noted that a hold signal d is produced by the period-to-voltage converter 15 immediately before the voltage signal a is outputted by the period-to-voltage converter 15. The operation of the second preferred embodiment shown in FIG. 5 is described hereinbelow with reference to FIG. 6.

Figure 6:
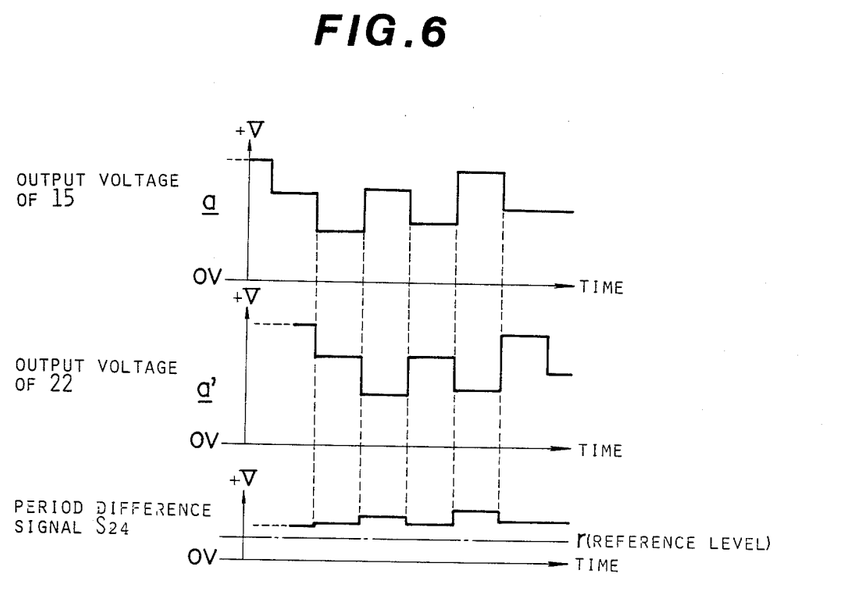
FIG. 6 is a signal waveform timing chart for some of the signals shown in FIG. 5.

In the case where another vehicle presently in the front detection area moves away from the detection area, the frequency difference signal $S_{24}$ outputted from the subtractor 24 is below the reference level r of the subsequent comparator 26 since the change in phase for each period of the Doppler signal, i.e., difference between the periods thereof, is small. The output voltage of the comparator 26 will be at a high level (goes high)

so that the AND gate circuit 20 is enabled. Consequently, the alarm circuit 30 is actuated when all other input signals of the AND gate circuit 20 are in the high-level state.

On the other hand, in the case when a pedestrian, etc., traverses the front detection area of the vehicle, a voltage signal a having large differences in level as shown by a in FIG. 6 is outputted from the period-to-voltage converter 15. The voltage signal a is applied to the hold circuit 22 and is held until the next period of the amplified Doppler signal. Consequently, the output voltage a' of the hold circuit 22 at any time represents the output voltage level a of the previous dopper signal cycle. These two output voltages a and a' are applied to the subtractor 24 whereby the period difference signal $S_{24}$ representing the absolute value of the difference in voltage between both two output voltage signals a and a' is produced. The magnitude of the period difference signal $S_{24}$ is proportional to the rate of change of the period, i.e., phase difference of the Doppler signal. Since the period difference signal $S_{24}$ exceeds the reference level r, the output voltage of the comparator 26 will be in a low-level state so that the AND gate circuit 20 is disabled. Consequently, the alarm circuit 30 is not actuated. Therefore, the moving obstacle detection system shown in FIG. 5 will not operate erroneously. It should be noted that even if the change in frequency of one cycle of the amplified Doppler signal is below the reference level r while the AND gate circuit 20 is disabled, the alarm circuit 30 will not be actuated since the alarm circuit 30 operates only if the duration of the high-level output signal from the AND gate circuit 20 continues over a predetermined interval of time which corresponds to several cycles of the Doppler signal.

As described hereinbefore, a moving obstacle detection system which detects and informs a vehicle driver that another vehicle located in front of the vehicle is approaching or moving away therefrom according to the present invention, wherein the informing operation is inhibited when the rate of change of frequency or phase with respect to time exceeds a predetermined value. Therefore, if another vehicle or a pedestrian, etc., traverses the front detection area toward which a Doppler radar of the moving obstacle detection system is directed and a Doppler frequency which exceeds a predetermined frequency value is detected, an erroneous indication that another vehicle in front of the vehicle has started is prevented. Consequently, the moving obstacle detection system according to the present invention achieves a high reliability in the detection of the start of another vehicle in front of the detecting vehicle.

It will be fully understood by those skilled in the art that the foregoing description is in terms of preferred embodiments of the present invention wherein various changes and modifications may be made without departing from the spirit and scope of the present invention, which is to be defined by the appended claims.

What is claimed is:

1. A moving obstacle detection system for a vehicle, comprising:
   (a) a Doppler radar transceiver for transmitting an electromagnetic radiation signal of known frequency, receiving the reflected radiation from moving objects within a specified detection area exposed to the transmitted radiation, and outputting a Doppler beat signal comprising a linear function of the transmitted and received radiation signals;
   (b) means responsive to said Doppler signal for indicating that an obstacle is moving towards or away from the vehicle when the rate of change of frequency of said Doppler signal exceeds a first predetermined value; and
   (c) inhibiting means responsive to said Doppler signal for preventing operation of said indicating means when the rate of change of frequency of said Doppler signal exceeds a second predetermined value exceeding the first predetermined value.

2. The system of claim 1, further comprising an amplitude judging circuit for preventing operation of said indicating means when the average positive peak amplitude of said Doppler signal does not exceed a predetermined amplitude level.

3. The system of claim 1, further comprising a vehicle halt detector for preventing operation of said indicating means when the vehicle is detected to be at rest.

4. The system of any one of claims 1, 2, or 3, wherein said indicating means comprises a period-to-voltage converter which converts said Doppler signal into a converted signal (a) comprising a train of pulses, the width and amplitude of each of which corresponds to one frequency cycle of said Doppler signal, a voltage comparator for comparing the converted signal to the first predetermined value and outputting an alarm signal when the converted signal level exceeds the first predetermined value, and an alarm circuit for broadcasting an alarm to the occupant of the vehicle in response to the alarm signal.

5. The system of claim 4, wherein said inhibiting means comprises means for converting the converted signal into a differentiated signal comprising a train of pulses, the amplitude of each of which is indicative of the difference in amplitude between two sequential pulses of the converted signal, and checking means for comparing the differentiated signal to the second predetermined value and outputting a high-level signal when the differentiated signal does not exceed the second predetermined value, and wherein said indicating means further comprises gating means for preventing the conduction of the alarm signal to the alarm circuit in the absence of the high-level signal from said comparing means.

6. The system of claim 5, wherein said gating means comprises an AND gate, the output terminal of which is connected to the alarm circuit, and the input terminals of which are connected to the output terminals of at least said checking means and the voltage comparator of said indicating means.

7. The system of claim 5, wherein said checking means comprises a second voltage comparator.

8. The system of claim 5, wherein said checking means comprises a second voltage comparator outputting a high-level signal when the differentiated signal exceeds the first predetermined value, a third voltage comparator for outputting a high-level signal when the differentiated signal exceeds the second predetermined value, an AND gate, one input terminal of which is connected to the second voltage comparator and an inverting input terminal of which is connected to the third voltage comparator, and an R-S flip-flop, the set terminal of which is connected to the output terminal of said AND gate, the reset terminal of which is connected to the third voltage comparator, and the Q-output terminal of which is connected to said gating means.

9. The system of claim 5, wherein said converting means comprises a voltage differentiator.

10. The system of claim 5, wherein said converting means comprises a hold circuit for delaying the converted signal for a period of time substantially equal to the current period of the converted signal and a subtracting circuit for subtracting the converted signal from the delayed converted signal from the hold circuit and outputting a voltage corresponding to the absolute value of the difference between the converted signal and the delayed converted signal.

11. A moving obstacle detection system for an automotive vehicle, comprising:
   (a) a Doppler radar module which directionally transmits a high-frequency wave in front of the vehicle, receives the reflected wave of the transmitted wave when an obstacle is present in the forward position of the vehicle, and outputs a Doppler signal having a beat frequency corresponding to the frequency difference between the transmitted and reflected waves and having an amplitude which changes according to the distance between the vehicle and obstacle;
   (b) a first means responsive to the Doppler signal from said Doppler radar module for determining whether the average amplitude of the Doppler signal exceeds a first predetermined value representing a predetermined distance between the moving obstacle and the vehicle, said first means outputting a first signal when the amplitude exceeds the first predetermined value;
   (c) a second means responsive to the Doppler signal from said Doppler radar module for converting the period of the Doppler signal into a corresponding voltage;
   (d) a third means for comparing the output voltage from said second means to a predetermined level and outputting a second signal when the output voltage of said second means exceeds the predetermined level;
   (e) a fourth means for detecting whether vehicle is at rest and outputting a third signal when the vehicle is stopped;
   (f) a fifth means responsive to the output voltage of said second means for determining whether the rate of change of the period of the Doppler signal with respect to time exceeds a predetermined value and outputting a fourth signal when the rate of change of the period of the Doppler signal does not exceed the predetermined value; and
   (g) an alarm circuit which produces an alarm for a vehicle driver when the duration of coincidence of the first, second, third, and fourth signals inputted thereinto exceeds a predetermined interval of time.

12. A moving obstacle detection system as set forth in claim 11, wherein said fifth means comprises:
   (a) a differentiator which differentiates the output voltage from said second means for detecting the change in the period of the Doppler signal;
   (b) a comparing circuit which compares the differentiated signal from said differentiator with a first predetermined threshold value, outputs a fifth signal when the differentatied signal level exceeds the first predetermined threshold value, simultaneously compares the differentiated signal with a second predetermined threshold value, and outputs a sixth signal when the differentiated signal exceeds the second predetermined threshold value, said second predetermined threshold value exceeding said first predetermined threshold value; and
   (c) a flip-flop circuit having a first terminal which receives the fifth signal from said comparing circuit and a second terminal which receives the sixth signal from said comparing circuit, and which is set to continue output of the fourth signal to said alarm circuit when the sixth signal is not received at the second terminal thereof.

13. A moving obstacle detection system as set forth in claim 12, wherein said comparing circuit is so constructed that one comparator compares the differentiated signal from said differentiator with the first predetermined threshold value, the other comparator compares the differentiated signal with the second predetermined threshold value, and the output of the fifth signal from said one comparator is inhibited when the sixth signal is outputted from said other comparator.

14. A moving obstacle detection system as set forth in claim 12, wherein said flip-flop circuit is a set-reset flip-flop circuit of the reset-priority type.

15. A moving obstacle detection system as set forth in claim 11, wherein said fifth means comprises:
   (a) a hold circuit responsive to the output voltage from said second means for holding the output voltage from said second means until the next change in the period of the Doppler signal;
   (b) a subtractor which receives the hold output voltage from said hold circuit and output voltage of said second means and outputs a signal, the level of which corresponds to the absolute value of the difference in period between successive cycles of the Doppler signal; and
   (c) a voltage comparator which compares the signal output from said subtractor to a predetermined level and outputs a signal which disables said alarm circuit, said signal from said comparator being the inversed level of said fourth signal, when the signal from said subtractor exceeds the predetermined level.

* * * * *